Figure 2:
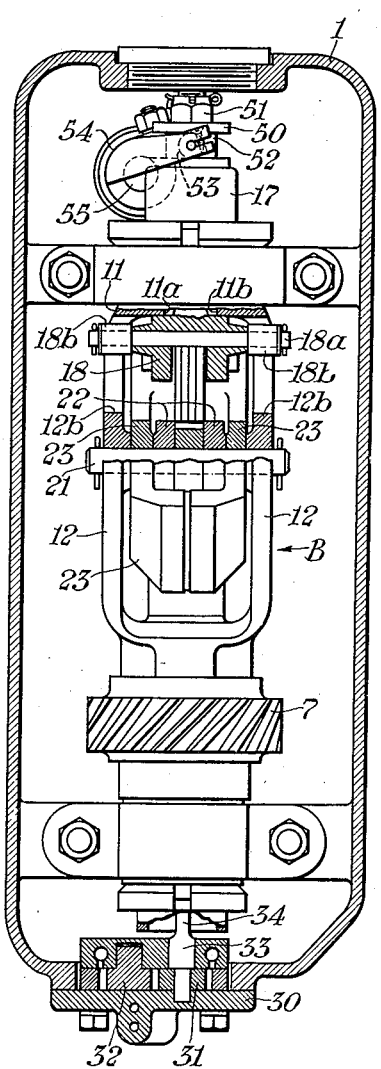

Nov. 4, 1941.     H. L. BONE ET AL     2,261,332
SPEED RESPONSIVE DEVICE
Original Filed April 30, 1938

INVENTORS
Herbert L. Bone and
John W. Livingston.
BY
THEIR ATTORNEY

Patented Nov. 4, 1941

2,261,332

UNITED STATES PATENT OFFICE 2,261,332

SPEED RESPONSIVE DEVICE

Herbert L. Bone and John W. Livingston, Forest Hills, Pa., assignors to The Union Switch & Signal Company, Swissvale, Pa., a corporation of Pennsylvania Original application April 30, 1938, Serial No. 205,276, now Patent No. 2,211,554, dated August 13, 1940. Divided and this application April 24, 1940, Serial No. 331,442

1 Claim. (Cl. 264—20)

Our invention relates to speed responsive devices, and particularly to speed governors which are adapted for use on high speed trains either in connection with automatic train control equipment to limit the speed at which the trains may operate under certain conditions, or in connection with the air brake system to enable the braking force exerted by the brakes to be varied in accordance with the train speed, whereby maximum brake efficiency may be obtained and a smooth stopping action may be effected.

One object of our invention is the provision in a governor of the type described of a centrifuge assembly which is statically balanced and fully stabilized, and which at the same time is highly sensitive to speed variations both accelerating and decelerating.

According to our invention a pair of carefully balanced crossed centrifuge arms are pivotally mounted at their point of intersection on a shaft carried at its ends in a pair of plates comprising part of a balanced rotatable member, in such manner that the weighted arms tend to move into a common plane in response to centrifugal force, and these arms are operatively connected by means of links and link heads with longitudinally movable rods secured to spring biased pistons disposed in longitudinally aligned cylindrical housings secured to said plates at their opposite ends. To prevent chattering due to differences between the centers of percussion of the two ends of the weighted arms caused by unavoidable manufacturing variations, the link head which is utilized to transmit the operating force from the weighted arms to the rod which is operatively connected with the contact mechanism of the governor is guided to give it true crosshead character, whereby the useful life of the governor is materially increased.

Other objects and characteristic features of our invention will become apparent as the description proceeds.

Governors embodying our invention are an improvement on the governor disclosed and claimed in Letters Patent of the United States No. 1,878,305, granted to Per Utne on September 20, 1932, for Speed responsive devices.

The present application is a division of our co-pending application, Serial No. 205,276, filed on April 30, 1938, for Speed responsive devices, now Patent No. 2,211,554, issued August 13, 1940.

We shall describe one form of governor embodying our invention, and shall then point out the novel features thereof in the claim.

Figure 1:
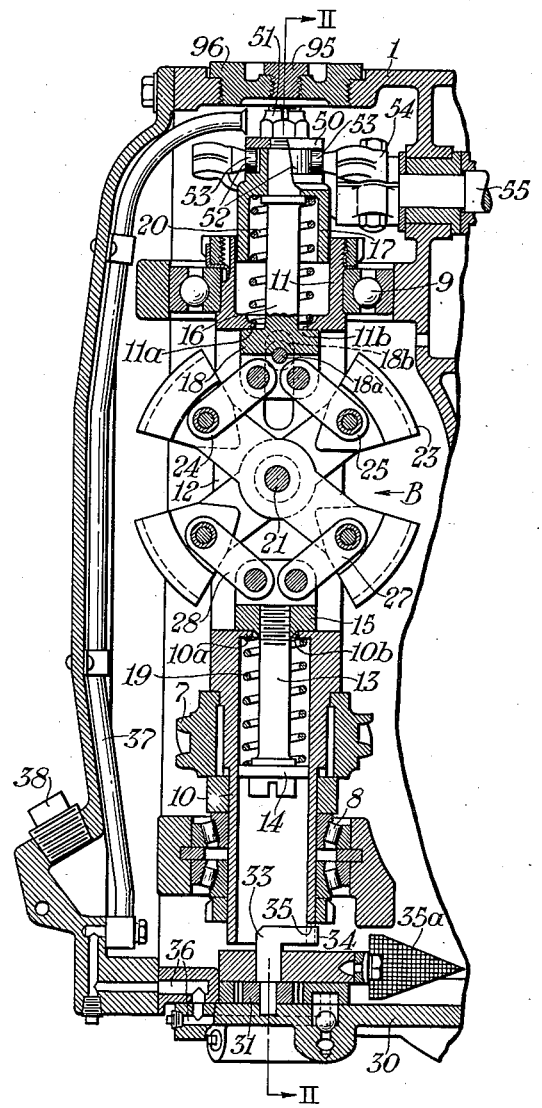

In the accompanying drawing, Fig. 1 is a vertical sectional view showing one form of governor embodying our invention. Fig. 2 is a sectional view taken substantially on the line II—II of Fig. 1.

Similar reference characters refer to similar parts in both views.

Referring to the drawing, the device comprises a suitable housing 1 which is adapted to be secured in any suitable manner not shown to the journal box of a railway vehicle adjacent one end of one of the axles of the vehicle. Rotatably mounted in the housing 1 by means of suitable antifriction bearings, here shown as a roller bearing 8 and a ball bearing 9, is a member B comprising two spaced longitudinally aligned tubular spring housings 10 and 11 connected together by two integral transversely spaced parallel side plates 12. The member B is adapted to be rotated at a speed which is proportioned at all times to the speed of the vehicle axle, and for this purpose the member B has secured thereto a helical gear 7 adapted to mesh with another gear driven from the axle. The confronting ends of the spring housings are provided with inwardly extending annular flanges 10a and 11a which form openings 10b and 11b, respectively, and extending with some clearance through the opening 10b into the housing 10 is a rod 13, the lower end of which is provided with what may be termed a piston 14, and the upper end of which is secured to a link head 15. A rod 16 similarly extends with some clearance through the opening 11b into the housing 11, and is provided at its upper end with a cup shaped piston 17, and is secured at its lower end to a link head 18. A coil spring 19 surrounds the rod 13 between the piston 14 and the flange 10a, and biases this rod to a lower position in which the link head 15 engages the flange 10a, and a coil spring 20 similarly surrounds the rod 16 between the piston 17 and the flange 11a and biases this latter rod to an upper position in which the link head 18 engages the flange 11a. The side plates 12 of the member B support a transversely extending shaft 21 which is located at equal distances from the two spring housings 11 and 12 and which passes through the axis of the member B at right angles thereto, and mounted on this shaft are two crossed centrifuge arms 22 and 23, each arm, as here shown, being made up of two parallel members. One end of each centrifuge arm 22 and 23 is pivotally connected by means of links 24 and 25 with the link head 18, and the other end of each centrifuge arm is pivotally connected by means of links 27 and 28 with the link head 15.

It will be seen, therefore, that when the member B is rotated the resulting centrifugal force will tend to move the centrifuge arms into a common plane which is perpendicular to the vertical axis of the member B, and that the springs 19 and 20 will exert opposite forces on the centrifuge arms in opposition to this centrifugal force. In other words, as the speed of rotation of the member B increases, the two pistons 14 and 17 will move toward each other, and as the speed of rotation of the member B decreases, these two pistons will move away from each other.

To prevent wear, it is necessary to provide adequate lubrication, and to this end the lower part of the housing 1 is intended to contain a quantity of oil, and an oil pump is provided to circulate this oil. The oil pump is mounted on a plate 30 secured to the bottom of the housing 1 and comprises two intermeshing gears 31 and 32. The gear 31 is secured to a vertical shaft 33 which is provided at its upper end with an arm 34 that projects into a slot 35 formed in the lower end of the housing 10, whereby this gear is operatively connected with the member B. The oil pumped by the oil pump is drawn through a strainer 35a and is forced through discharge passages 36 into a pipe 37 which extends to the top of the member B. The pipe 37 is provided with a plurality of holes (not shown) which are disposed opposite the centrifuge arms 22 and 23, and is open at its upper end, and it will be seen therefore that when the member B is rotated, oil will be continually supplied to all of the moving parts. To permit the insertion of oil into the housing 1, a plug 38 is provided, as best seen in Fig. 1.

The piston 17 of the centrifuge device is provided at its upper end with a reduced portion which, together with a washer 50 which is clamped against this reduced portion by means of a castellated nut 51, forms an annular groove 52, and extending into this groove at diametrically opposite points are two rollers 53 mounted on a crank arm 54. The crank arm 54 is secured to one end of a cam shaft 55 which is mounted to oscillate about an axis perpendicular to the longitudinal axis of the member B, and it will be apparent therefore that the cam shaft 55 will be rotated in one direction in response to an increase in the speed of rotation of the member B, and in the opposite direction in response to a decrease in the speed of rotation of the member B. The cam shaft 55 may be utilized to operate suitable contact mechanism in a manner which is described in detail in our copending application, Serial No. 205,276, (now Patent No. 2,211,554), referred to hereinbefore.

It is at times desirable to force the piston 17 through its operating stroke when the governor is at rest for test and inspection purposes. To this end, we provide a plug 95 which is screwed into a threaded hole located in a larger plug 96 directly above the rod 16, and which, when it is desired to operate the piston, is replaced by a hand screw (not shown). Screwing in the hand screw forces the rod 16 downwardly against the forces of the centrifuge springs, and the centrifuge arms may therefore be moved as though the centrifuge were being centrifugally operated. When the operation of the governor has been checked, the hand screw is removed and the plug 95 is replaced.

It is essential, in order to insure smooth operation and long life of the governor, that the centrifuge arms should have equal masses and should be as nearly balanced about their axis of rotation as possible. It is also essential that the overall size of the governor should be kept as small as possible and that the governor should be capable of satisfactory operation at low speeds. To enable the governor to operate at low speeds and have a minimum size, it is necessary to expand the outline of the centrifuge arms in all directions which clearances will permit, and when this is done the cost of machining the arms all over to obtain the desired balance becomes prohibitive because of the irregular outline which results. Accordingly, in order to obtain the desired uniformity in weight and the proper balance and still permit the arms to be manufactured at a reasonable cost, we utilize arms which are cast with an excessive amount of mass, and after machining the parts of the arms which of necessity must be machined we equalize the mass of the arms and balance them as follows:

The arms are first each weighed to determine the excess mass by placing them on one arm of a balance, the other arm of which carries a standard weight, and adding to the balance arm carrying the standard weight a sufficient number of special weight pellets to effect the balance, the pellets being of such size that each contains the same mass of metal as will be removed from the arm by drilling a hole of known size and depth in the arm. The arms are next each placed upon a rod through its axis hole, and the number of pellets which were added to the balance during the weighing operation are distributed between the two ends of the arm in a manner to cause the arm to balance about its axis, after which a hole is drilled in each end of the arm to a depth as indicated by the number of pellets at the opposite end.

With the centrifuge arms manufactured in the manner just described, the arms have equal weights and are balanced, but due to unavoidable manufacturing variations it sometimes happens that the center of percussion of one end of an arm is different from that of the other end of the arm, and when this happens the unequal centrifugal forces which are set up in the two ends of the arm tend to cause the weight assembly as a whole to rotate about the pin 21 in one direction or the other in a manner which tends to produce a side thrust on the rods 13 and 16 and which causes the upper rod 16 to get out of line with its proper axis. We have found that any misalignment of the rod 16 causes erratic operation and chattering of the governor contacts and also tends to cause excessive stresses on crank 54 and the pins supporting rollers 53, and that these undesirable results can be eliminated by properly guiding the upper link head 18 in a manner to give it true crosshead character. In accordance with our present invention, we effect the necessary guiding action by providing in the side plates 12 of the member B opposite the link head 18 a pair of aligned slots 12b and by securing to the link head a rod 18a which extends parallel to the axis of the rod 21, and the ends of which rod 18a carry guide rollers 18b which ride in the slots 12b. This method of guiding the upper link head permits it to move freely in a vertical direction, but prevents it from moving away from the position in which the associated rod 16 is in proper vertical alignment, and hence insures smooth operation of the governor and long life.

Although we have herein shown and described only one form of speed responsive device embodying our invention, it is understood that various changes and modifications may be made therein within the scope of the appended claim without departing from the spirit and scope of our invention.

Having thus described our invention, what we claim is:

A speed responsive device comprising a balanced rotatable member consisting of two spaced and longitudinally aligned cylindrical housings connected by two transversely spaced side plates, a transverse shaft carried by said side plates, a pair of balanced crossed centrifuge arms pivotally mounted at their point of intersection on said shaft between said side plates and tending to move into a common plane in response to centrifugal force, a piston in each housing, a rod attached to each piston and projecting toward said arms, a link head secured to the inner end of each rod, links connecting each arm with each of said link heads, springs in said housings acting on said pistons to exert forces on said arms in opposition to the centrifugal force acting thereon, and a second transverse shaft secured to one of said link heads and extending parallel to said first shaft and provided at its ends with rollers which ride in aligned slots formed in said side plates to guide said one link head vertically.

HERBERT L. BONE.
JOHN W. LIVINGSTON.